United States Patent
Gaubil et al.

(10) Patent No.: US 9,481,594 B2
(45) Date of Patent: Nov. 1, 2016

(54) REFRACTORY PRODUCT HAVING A HIGH CONTENT OF ZIRCONIA

(75) Inventors: Michel Gaubil, Les Angles (FR); Ludovic Massard, Monteux (FR)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 308 days.

(21) Appl. No.: 13/993,553

(22) PCT Filed: Dec. 15, 2011

(86) PCT No.: PCT/IB2011/055715
§ 371 (c)(1),
(2), (4) Date: Jun. 12, 2013

(87) PCT Pub. No.: WO2012/080981
PCT Pub. Date: Jun. 21, 2012

(65) Prior Publication Data
US 2013/0255316 A1 Oct. 3, 2013

(30) Foreign Application Priority Data
Dec. 16, 2010 (FR) .................... 10 60659

(51) Int. Cl.
C04B 35/484 (2006.01)
C03B 5/43 (2006.01)
C04B 35/48 (2006.01)
C04B 35/645 (2006.01)

(52) U.S. Cl.
CPC .............. *C03B 5/43* (2013.01); *C04B 35/481* (2013.01); *C04B 35/484* (2013.01); *C04B 35/645* (2013.01); *C04B 2235/3201* (2013.01); *C04B 2235/3217* (2013.01); *C04B 2235/3248* (2013.01); *C04B 2235/3409* (2013.01); *C04B 2235/3418* (2013.01); *C04B 2235/442* (2013.01); *C04B 2235/656* (2013.01); *C04B 2235/6567* (2013.01); *C04B 2235/72* (2013.01); *C04B 2235/727* (2013.01); *C04B 2235/765* (2013.01)

(58) Field of Classification Search
None
See application file for complete search history.

(56) References Cited

U.S. PATENT DOCUMENTS

| 4,507,394 | A | 3/1985 | Mase et al. | |
|---|---|---|---|---|
| 5,023,218 | A | 6/1991 | Zanoli et al. | |
| 5,466,643 | A | 11/1995 | Ishino et al. | |
| 5,679,612 | A | 10/1997 | Endo et al. | |
| 5,776,397 | A * | 7/1998 | Kuroda | C03B 5/43 264/161 |
| 7,655,587 | B2 * | 2/2010 | Boussant-Roux | C03B 5/43 501/105 |
| 7,687,422 | B2 * | 3/2010 | Boussant-Roux | C03B 5/43 501/105 |
| 8,124,554 | B2 * | 2/2012 | Boussant-Roux | C03B 5/43 501/103 |
| 8,273,673 | B2 * | 9/2012 | Cabodi | C03B 5/43 501/105 |
| 8,288,300 | B2 * | 10/2012 | Cabodi | C03B 5/43 501/105 |
| 8,497,221 | B2 * | 7/2013 | Alasia | C03B 5/43 501/105 |
| 8,563,454 | B2 * | 10/2013 | Gaubil | C03B 5/43 501/105 |
| 8,765,620 | B2 * | 7/2014 | Gaubil | C03B 5/43 501/105 |
| 8,822,362 | B2 * | 9/2014 | Cabodi | C03B 5/43 501/105 |
| 8,859,445 | B2 * | 10/2014 | Cabodi | C03B 5/43 501/105 |
| 2008/0076659 | A1 * | 3/2008 | Boussant-Roux | C03B 5/43 501/105 |
| 2010/0068492 | A1 * | 3/2010 | Boussant-Roux | C03B 5/43 428/220 |
| 2011/0212826 | A1 * | 9/2011 | Cabodi | C03B 5/43 501/104 |
| 2012/0046156 | A1 * | 2/2012 | Gaubil | C03B 5/43 501/104 |
| 2015/0007614 | A1 * | 1/2015 | Gaubil | C04B 35/484 65/374.13 |

FOREIGN PATENT DOCUMENTS

| EP | 0 403 387 A1 | 12/1990 | |
|---|---|---|---|
| FR | 1.208.577 | 2/1960 | |
| FR | 75.893 | 8/1961 | |
| FR | 82.310 | 1/1964 | |
| FR | 1.542.705 | 10/1968 | |
| FR | 2 701 022 A1 | 8/1994 | |
| FR | 2 723 583 A1 | 2/1996 | |
| FR | 2920153 A1 * | 2/2009 | ............... C03B 5/43 |
| FR | 2942468 A1 * | 8/2010 | ............... C03B 5/43 |
| JP | H03-146475 A | 6/1991 | |

OTHER PUBLICATIONS

Srinivasan et al., "Ferroelastic Domain Switching in Polydomain Tetragonal Zirconia Single Crystals", J. Am. Ceram. Soc., 72 (11), pp. 2098-2103 (1989).*

(Continued)

*Primary Examiner* — Lisa Herring
(74) *Attorney, Agent, or Firm* — Oliff PLC

(57) ABSTRACT

The invention relates to a process for manufacturing a refractory product, comprising the following successive steps: a) mixing of raw materials so as to form a suitable feedstock so that the block obtained in step d) comprises more than 85% of $ZrO_2$, b) melting of said feedstock until a molten material is obtained, c) optionally, casting said molten material, d) cooling of the molten material to solidification in the form of a block, e) optionally, heat treatment, process comprising a compression operation in which a compression pressure of greater than 0.2 MPa is applied to at least one portion of the outer surface of the block obtained in step d), the compression operation beginning at a temperature above the temperature at which, in said block, tetragonal zirconia is converted to monoclinic zirconia or "phase transformation temperature", and ending at a temperature below said phase transformation temperature.

15 Claims, No Drawings

(56) References Cited

OTHER PUBLICATIONS

Virkar et al., "The Role of Ferroelasticity in Toughening of Brittle Materials", Phase Transitions, vol. 35, pp. 27-46, 1991.*
Whitney, "Effect of Pressure on Monoclinic-Tetragonal Transition of Zirconia; Thermodynamics", J. Am. Ceramic Soc. Discussion and Notes, vol. 45, No. 12, pp. 612-613, Dec. 1962.*
English Translation of JP03-146475 Performed by Schreiber Translation, Inc. Oct. 2015.*
Neukunft et al., "Fused Cast Bricks," *Pocket Manual Refractory Materials, $3^{rd}$ Edition,* 2008, pp. 153-163.
Nikolay, "Zirconiumoxid," *Technische Keramik, Grundlagen, Werkstoffe, Verfahrenstechnik; 2, Auflage,* 2009, pp. 231-247.
International Search Report issued in International Patent Application No. PCT/IB2011/055715 dated Feb. 29, 2012 (with translation).
May 25, 2015 Office Action issued in Japanese Application No. 2013-543955.

\* cited by examiner

REFRACTORY PRODUCT HAVING A HIGH CONTENT OF ZIRCONIA

TECHNICAL FIELD

The invention relates to a novel fused refractory product having a high zirconia content, to a glass melting furnace comprising a refractory product according to the invention, and also to a process for manufacturing such a product.

PRIOR ART

Among refractory products, a distinction is drawn between fused products, well known for the construction of glass melting furnaces, and sintered products.

Unlike sintered products, as described for example in U.S. Pat. No. 4,507,394, fused products usually comprise an intergranular glassy phase connecting crystallized grains. The problems encountered with sintered products and with fused products, and the technical solutions adopted for solving them, are therefore generally different. A composition developed for manufacturing a sintered product therefore cannot a priori be used as such for manufacturing a fused product, and vice versa.

Fused products, often referred to as electrofused products, are obtained by melting a mixture of suitable raw materials in an electric arc furnace or by any other technique suitable for these products. The molten material is then conventionally cast in a mold, then the product obtained undergoes a controlled cooling cycle in order to be brought to ambient temperature without fracturing. This operation is referred to as "annealing" by those skilled in the art.

Among fused products, electrofused products having a very high zirconia content (VHZC), that is to say comprising more than 85% by weight of zirconia, are renowned for their quality of very high corrosion resistance without coloring the glass produced and without generating defects.

Conventionally, fused products having a high zirconia content also comprise sodium oxide ($Na_2O$) in order to prevent the formation of zircon from the zirconia and the silica present in the product. This is because zircon formation is deleterious since it is accompanied by a reduction in volume of the order of 20%, thus creating mechanical stresses that initiate cracks.

The product ER-1195 produced and sold by Société Européenne des Produits Réfractaires, and covered by the patent EP-B-403 387 is today widely used in glass melting furnaces. Its chemical composition comprises around 94% of zirconia, 4% to 5% of silica, around 1% of alumina, 0.3% of sodium oxide and less than 0.05% by weight of $P_2O_5$. It is typical of products having a high zirconia content used in glass furnaces.

FR 2 701 022 describes fused cast products having a high zirconia content that contain 0.05% to 1.0% by weight of $P_2O_5$ and 0.05% to 1.0% by weight of boron oxide $B_2O_3$.

FR 2 723 583 describes fused cast products having a high zirconia content that contain 3% to 8% by weight of $SiO_2$, 0.1% to 2.0% by weight of $Al_2O_3$, 0.05% to 3.0% by weight of boron oxide $B_2O_3$, 0.05% to 3% by weight of BaO+SrO+ MgO, and 0.05% to 0.6% by weight of $Na_2O+K_2O$ and less than 0.3% by weight of $Fe_2O_3+TiO_2$.

Contact with a molten glass or with the atmosphere of the glass melting furnace leads to wear of the products, in particular by corrosion. There is a need for a refractory product having a high zirconia content that has a greater service life within a wall of a glass melting furnace, in particular a furnace for melting glass for LCD flat screens.

The present invention aims to satisfy this need.

SUMMARY OF THE INVENTION

The invention relates to a process for manufacturing a refractory product, comprising the following successive steps:

a) mixing of raw materials so as to form a suitable feedstock so that the block obtained in step d) comprises more than 85% of $ZrO_2$, b) melting of said feedstock until a molten material is obtained, c) optionally, casting of said molten material, d) cooling of the molten material to solidification in the form of a block, e) optionally, heat treatment, in particular annealing heat treatment.

This process is noteworthy in that it comprises a compression operation wherein a compression pressure of greater than 0.2 MPa is applied to at least one portion of the outer surface of the block obtained in step d), the compression operation beginning at a temperature above the temperature at which, in said block, the tetragonal zirconia is transformed into monoclinic zirconia, or "phase transformation temperature", and ending at a temperature below said phase transformation temperature.

For the sake of clarity, the expressions "product according to the invention" or "block according to the invention" below refer to a product manufactured or capable of having been manufactured by a process according to the invention.

Surprisingly, the inventors have discovered that a furnace wall formed with products according to the invention has a service life greater than a wall formed with products according to the prior art.

Without being bound by this theory, the inventors have observed that a product according to the invention shrinks less when its zirconia changes from the monoclinic phase to the tetragonal (or "quadratic") phase, in particular during annealing (first temperature rise of the glass melting furnace). The opening of the joints between the blocks resulting from this shrinkage is therefore reduced thereby. The molten glass therefore has greater difficulties in penetrating between the blocks, which would explain a lower corrosion, and therefore a greater service life.

The invention also relates to a product obtained or capable of having been obtained by a process according to the invention. In particular, the invention relates to a fused refractory product comprising more than 85% of $ZrO_2$, as a percentage by weight on the basis of the oxides, and having a lower deformation, preferably more than 10%, more than 30%, more than 50% lower, than that of a fused refractory product of the same composition, of the same dimensions, but that has not undergone a compression operation in accordance with that of a process according to the invention.

Preferably, the deformation is measured with a dilatometer on a sample withdrawn from an area extending parallel to the outer surface of the product intended to be in contact with the molten glass or with the atmosphere of the glass melting furnace, at more than 30 mm from said outer surface.

The invention also relates to a glass melting furnace comprising a refractory product according to the invention, in particular in the regions brought to high temperatures, and especially in the regions intended to be in contact with the molten glass or in contact with the atmosphere of the melting furnace (superstructures).

In particular, the invention relates to a glass melting furnace comprising a wall consisting of blocks assembled by joints, said wall having, after annealing, sealed joints.

DEFINITIONS

The percentages by weight of oxides relate to the overall contents for each of the corresponding chemical elements, expressed in the form of the most stable oxide, according to the standard convention of the industry.

$HfO_2$ cannot be chemically dissociated from $ZrO_2$. However, according to the present invention, $HfO_2$ is not intentionally added to the feedstock. $HfO_2$ therefore denotes only traces of hafnium oxide, this oxide always being naturally present in zirconia sources at contents generally of less than 5%, generally of less than 2%. For the sake of clarity, it is therefore possible to denote, without distinction, the content of zirconia and of hafnium oxide traces by "$ZrO_2$" or else "zirconia content".

A product is conventionally said to be "fused" when it is obtained by a process that carries out a melting of raw materials and a solidification via cooling.

A "molten material" is a liquid mass which, in order to retain its shape, must be contained in a container. It may contain a few solid particles, but in an amount insufficient for them to be able to structure said mass.

The term "impurities" is understood to mean the inevitable constituents introduced unintentionally and necessarily with the raw materials or resulting from reactions with these constituents. The impurities are not necessary constituents, but merely tolerated. For example, compounds belonging to the group of oxides, nitrides, oxynitrides, carbides, oxycarbides, carbonitrides and iron, titanium, vanadium and chromium metallic species are impurities.

Of course, the compression pressure is the pressure exerted beyond the atmospheric pressure of around 0.1 MPa. A compression pressure of 0.2 MPa therefore corresponds to an actual pressure of around 0.3 MPa.

Unless otherwise mentioned, all the amounts of oxides in the products described and claimed are percentages by weight on the basis of the oxides.

DETAILED DESCRIPTION OF THE INVENTION zirconia exists in three crystallographic forms. In the absence of dopant, zirconia is in the monoclinic form up to 1150° C., in the stable tetragonal form between 1150° C. and 2370° C., and in the cubic form starting from 2370° C.

During the annealing of a furnace, the walls of which comprise blocks made of VHZC ("very high zirconia content"), the transformation from the monoclinic phase to the tetragonal phase is accompanied by a reversible reduction in volume of around 4.5% that the addition of a zirconia stabilizer may limit.

Alternatively or in addition to the addition of a stabilizer, a compression operation according to the invention makes it possible to limit the shrinkage, irrespective of the VHZC product considered.

In a fused product according to the invention, the very high zirconia content, that is to say $ZrO_2$>85% by weight, makes it possible to meet the requirements of high corrosion resistance without coloring the glass produced or generating defects that impair the quality of this glass.

The weight content of $ZrO_2$ may be less than 97.0%, or even less than 96.5% and/or preferably greater than 88.0%, preferably greater than 90.0%, preferably greater than 92.0%, preferably greater than 94.0%.

Preferably, at least 80%, preferably at least 90%, or even at least 99% or substantially 100% of the zirconia, in percentages by weight, is monoclinic at ambient temperature.

The presence of silica $SiO_2$ is advantageous, the formation of an intergranular glassy phase making it possible to effectively accommodate the variations in volume of the zirconia during its reversible allotropic transformation. Too high a silica content could however generate defects in the glass by releasing stones (fragments of refractory product resulting from loss of cohesion of the product), which is considered to be bad behavior in the application.

The weight content of silica $SiO_2$ is preferably greater than 0.5%, greater than 2.5%, or even greater than 3.0%, preferably greater than 4.0%. It may be less than 15.0%, or even less than 10.0%, less than 9.0%, or even less than 8.0%, or even less than 7.0%, or even less than 6.0%.

The other species such as $Al_2O_3$, $B_2O_3$, $Na_2O$, $K_2O$, $Y_2O_3$, BaO, SrO, MgO, CaO, $CeO_2$, $Ta_2O_5$ and $Nb_2O_5$ preferably represent, in percentages by weight, less than 10%, preferably less than 9%, more preferably less than 8%, or even less than 5%.

The iron, titanium and phosphorus oxides are known for being deleterious and their content must be limited to traces introduced as impurities with the raw materials. Preferably, the weight content of $Fe_2O_3$+$TiO_2$ is less than 0.55%, less than 0.4%, preferably less than 0.3%, preferably less than 0.2% and that of $P_2O_5$ is less than 0.05%.

A product according to the invention may be manufactured according to steps a) to e) below:

Any conventional process for manufacturing zirconia-based fused products intended for applications in glass melting furnaces may be adapted so as to comprise a compression operation in which at least one portion, preferably at least all of one face of the block resulting from step d) is subjected to a compression pressure of greater than 0.2 MPa, the compression operation beginning at a temperature above the phase transformation temperature of the zirconia (between the tetragonal and monoclinic phases) and ending at a temperature below said phase transformation temperature.

In step a), the feedstock is adapted, in a known manner, as a function of the composition of the desired product.

In step b), the melting is preferably carried out through the combined action of a relatively long electric arc, producing no reduction, and stirring that promotes the reoxidation of the products. The melting is conventionally carried out at a temperature above 2300° C., preferably between 2400° C. and 2500° C.

In order to minimize the formation of nodules of metallic appearance and to avoid the formation of cracks or crazing in the final product, it is preferable to carry out the melting under oxidizing conditions.

Preferably, the long-arc melting process described in French patent 1 208 577 and its additions 75893 and 82310 is used.

This process consists in using an electric arc furnace in which the arc springs between the charge and at least one electrode some distance from this charge and in adjusting the length of the arc so that its reducing action is minimized, while maintaining an oxidizing atmosphere above the molten bath and by stirring said bath, either through the action of the arc itself or by bubbling an oxidizing gas (air or oxygen for example) into the bath or else by adding oxygen-releasing substances such as peroxides to the bath.

In step c), the molten material is conventionally poured into a mold.

In step d), the cooling is preferably carried out at the rate of around 10° C. per hour. According to the invention, the block thus obtained undergoes a compression operation.

The compression operation must begin at a temperature above the phase transformation temperature of the zirconia to the monoclinic phase, in said block, and end at a temperature below this phase transformation temperature.

Preferably, the compression operation is carried out after complete solidification of the molten material.

The compression operation may be carried out during the first cooling of the solidified block (during the annealing step), preferably immediately after its complete solidification.

The compression operation may be carried out during a subsequent step, for example during a specific heat treatment (step e)).

Preferably, the compression operation begins at a temperature above 1000° C., above 1020° C., above 1050° C., or even above 1100° C., and/or preferably below 1500° C., below 1400° C., below 1300° C., below 1200° C.

The duration of the compression operation (during which the compression pressure applied is greater than the minimum pressure of 0.2 MPa) is not limiting.

According to one embodiment, the compression operation continues until the block has cooled to ambient temperature.

According to another embodiment, the compression operation is stopped when the temperature of the block is between 800° C. and 900° C., or even between 500° C. and 800° C.

During the compression operation, the temperature of the block may vary. It may in particular decrease continuously, or decrease in stages, with one or more holds.

Throughout the compression operation, the compression pressure is preferably greater than 0.3 MPa, preferably greater than 0.4 MPa, preferably greater than 0.5 MPa, preferably greater than 1.0 MPa, preferably greater than 1.25 MPa, preferably greater than 1.5 MPa, preferably greater than 1.75 MPa, preferably greater than 2.0 MPa, or even greater than 2.5 MPa. The compression pressure may be less than 15.0 MPa, less than 10.0 MPa, less than 5.0 MPa, or even less than 3.0 MPa.

The compression pressure may vary during the compression operation. Preferably, it is constant. It may be applied instantaneously from the start of the compression operation. It may also be applied gradually, for example increasingly. It may also be applied via successive holds.

The compression operation may comprise one or more hold(s) at different compression pressures.

Likewise, at the end of the compression operation, the compression pressure may be reduced instantaneously or gradually, for example decreasingly, preferably until becoming zero.

The compression pressure is preferably exerted at least over the surfaces of the block intended to be opposite other blocks (that is to say facing other blocks), conventionally by means of joints, or even is exerted exclusively over these surfaces. These surfaces are conventionally referred to as "joint faces".

Preferably, the compression pressure is applied in a single direction, preferably in the direction perpendicular to the joint faces.

The compression pressure may also be adapted so that the product obtained has at least one given dimension; preferably, the pressure is applied to the joint faces and the other surfaces are left free.

Preferably, the compression pressure is exerted homogeneously.

Preferably, the compression pressure is exerted over all the joint faces.

In one embodiment, the invention relates to a process comprising, in addition to the steps of a manufacturing process according to the invention, a step f) in which the block obtained at the end of step d) or e) is positioned in a wall of a furnace, at least the surfaces of the block opposite other blocks, or even only these surfaces, having been subjected to a compression operation.

The compression pressure may be exerted by any means, for example by hydraulic pressure. It may also result from an immobilization of the block by clamping, for example using chocks, so as to prevent its expansion in one or two directions. Preferably, if the shape of the block allows it, the block is held in a vice via its two opposite joint faces.

The pressure may also be exerted using a mobile wall of the mold, for example using the mold described in FR 1 542 705.

A pressure exerted on this wall makes it possible to apply a compression pressure on the surface of the product in contact with said wall (and of course on the opposite surface of the product).

Depending on the shape of the mold, other surfaces of the product may also be compressed during the displacement of the mobile wall, optionally at a pressure of greater than 0.2 MPa. Preferably however, in order to obtain a compression pressure of greater than 0.2 MPa on each of the joint faces of the product, several walls may be mobile and be subjected to a compression force. A person skilled in the art knows how to adapt the mold from FR 1 542 705 for this purpose.

EXAMPLES

The following non-limiting examples are given for the purpose of illustrating the invention.

Examples A and B correspond to blocks having the composition of the products ER1195 and SCIMOS CZ sold by Saint-Gobain.

In these examples, the following raw materials were used:
zirconia containing mainly, on average by weight, 98.5% of $ZrO_2$, 0.2% of $SiO_2$ and 0.02% of $Na_2O$,
zircon sand containing 33% of silica,
alumina of AC44 type sold by the company Pechiney and containing on average 99.4% of alumina $Al_2O_3$,
sodium carbonate and/or boron oxide.

The examples were prepared according to the conventional arc furnace melting process, then cast in order to obtain blocks measuring 220 mm×450 mm×150 mm.

The chemical analysis of the products obtained is given in table 1; it is an average chemical analysis, given in percentages by weight.

TABLE 1

| Composition | $SiO_2$ | $Na_2O$ | $B_2O_3$ | $Al_2O_3$ | others | $ZrO_2$ |
|---|---|---|---|---|---|---|
| A | 4.0 | 0.3 | | 1.2 | 0.3 | 94.2 |
| B | 4.5 | | 0.5 | 0.6 | 0.4 | 94.0 |

After casting and solidification, the blocks were subjected to a heat treatment consisting in gradually bringing the block to 1500° C., then in maintaining this temperature for 1 hour before gradually dropping back down to ambient temperature, passing through a 30 minute hold at 1150° C. Some of these blocks were subjected, during this treatment, to a compression pressure applied starting from 1149° C. and maintained until 800° C., i.e. for 7 hours. During the compression operation, the pressure was applied by clamping the joint faces of the block.

The deformation is measured during the temperature increase of the block. It corresponds to the difference between the length in the maximum expansion position (before the transformation of the zirconia) and the length in the minimum expansion position just after the transformation of monoclinic zirconia to tetragonal zirconia, divided by the length in the initial position.

Table 2 provides the values of the pressures optionally applied and the results obtained.

A negative stress corresponds to a compression pressure.

TABLE 2

| Stress (MPa) | Product | Deformation (%) |
|---|---|---|
| 0 | A | 1.20 |
| −0.5 | A | 0.87 |
| −1 | A | 0.75 |
| −2 | A | 0.49 |
| 0 | B | 1.04 |
| −2 | B | 0.56 |

The compression pressure values indicated in table 2 correspond to the maximum values of the pressure during the compression operation.

These examples make it possible to observe that the implementation of a compression operation results in a considerable improvement in performances.

Furthermore, other tests made it possible to verify that the other known properties for materials having a very high zirconia content, in particular the resistance to corrosion by the glass, are not degraded by the implementation of a compression operation according to the invention.

Of course, the present invention is not limited to the embodiments described and represented, provided by way of illustrative and non-limiting examples.

The invention claimed is:

1. A process comprising the following successive steps:
   a) mixing of raw materials so as to form a suitable feedstock so that a block obtained in step d) comprises more than 85% of $ZrO_2$,
   b) melting of said feedstock until a molten material is obtained,
   c) optionally, casting of said molten material,
   d) cooling of the molten material to solidification in the form of a block having at least 80% of the zirconia, in percentages by weight, being monoclinic at ambient temperature, and
   e) optionally, heat treatment, wherein the process further comprises a compression operation wherein a compression pressure of greater than 0.2 MPa is applied to at least one portion of the outer surface of the block obtained in step d), the compression operation beginning at a temperature above the temperature at which, in said block, the tetragonal zirconia is transformed into monoclinic zirconia, or "phase transformation temperature", and ending at a temperature below said phase transformation temperature.

2. The process as claimed in claim 1, wherein the compression operation begins at a temperature above 1000° C. and below 1500° C.

3. The process as claimed in claim 1, wherein the compression operation begins at a temperature above 1020° C.

4. The process as claimed in claim 3, wherein the compression operation begins at a temperature above 1050° C.

5. The process as claimed in claim 4, wherein the compression operation begins at a temperature above 1100° C.

6. The process as claimed in claim 1, wherein the compression pressure is greater than 0.5 MPa throughout the entire compression operation.

7. The process as claimed in claim 6, wherein the compression pressure is greater than 1.0 MPa throughout the entire compression operation.

8. The process as claimed in claim 7, wherein the compression pressure is greater than 1.5 MPa throughout the entire compression operation.

9. The process as claimed in claim 1, wherein the compression pressure is less than 15.0 MPa throughout the entire compression operation.

10. The process as claimed in claim 1, wherein the compression operation ends at a temperature between 800° C. and 900° C.

11. The process as claimed in claim 1, wherein the compression operation continues to ambient temperature.

12. The process as claimed in claim 1, wherein the compression operation is carried out during step d).

13. The process as claimed in claim 1, wherein at step d) the molten material is cooled to solidify in the form of a block having at least 99% of the zirconia, in percentages by weight, being monoclinic at ambient temperature.

14. The process as claimed in claim 1, further comprising a step f) in which the block obtained at the end of step d) or e) is positioned in a wall of a furnace, at least the surfaces of the block opposite other blocks, or even only these surfaces, having been subjected to a compression operation.

15. The process as claimed in claim 1, wherein the cooling at step d) is carried out at the rate of 10° C. per hour.

* * * * *